United States Patent [19]

Bellino et al.

[11] 4,222,284
[45] Sep. 16, 1980

[54] SELECTOR PIN ASSEMBLY FOR MANUAL TRANSMISSION SHIFTER

[75] Inventors: Ralph R. Bellino, Cleveland; Michael J. Bellino, Parma, both of Ohio; Robert Thompson, Westchester, Pa.

[73] Assignee: W. R. Grace & Co., Columbia, Md.

[21] Appl. No.: 905,669

[22] Filed: May 15, 1978

[51] Int. Cl.² .......................... G05G 9/08; G05G 9/16
[52] U.S. Cl. .................................. 74/473 R; 74/475; 74/538
[58] Field of Search ................... 74/473 R, 475, 535, 74/538; 403/156

[56] References Cited

U.S. PATENT DOCUMENTS

| | | | |
|---|---|---|---|
| 773,474 | 10/1904 | Chadwick | 74/538 |
| 2,440,928 | 5/1948 | Bower | 74/535 X |
| 2,919,942 | 1/1960 | Bechtel | 403/156 |
| 3,636,793 | 1/1972 | Bieber | 74/473 R |
| 3,757,600 | 9/1973 | Bieber | 74/473 R |
| 4,028,959 | 6/1977 | Long | 74/473 R |
| 4,118,999 | 10/1978 | Bieber | 74/475 |

FOREIGN PATENT DOCUMENTS 600883  2/1926  France ........................................ 74/538

*Primary Examiner*—Allan D. Herrmann
*Attorney, Agent, or Firm*—William Kovensky

[57] ABSTRACT

An improved selector pin assembly for automotive transmission shifters of the type where the main shifter lever carries the selector pin. The improved structure comprises a pair of side slats joined at their ends by hollow sleeves, the assemblage being held rigidly together and on the shifter by nuts and bolts passing through the sleeves.

5 Claims, 3 Drawing Figures

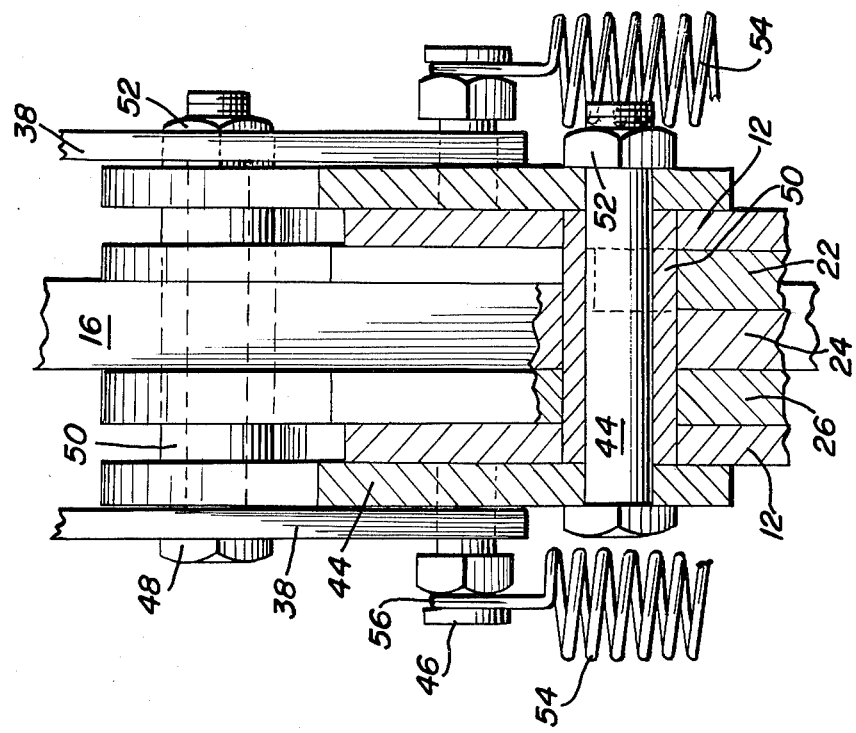
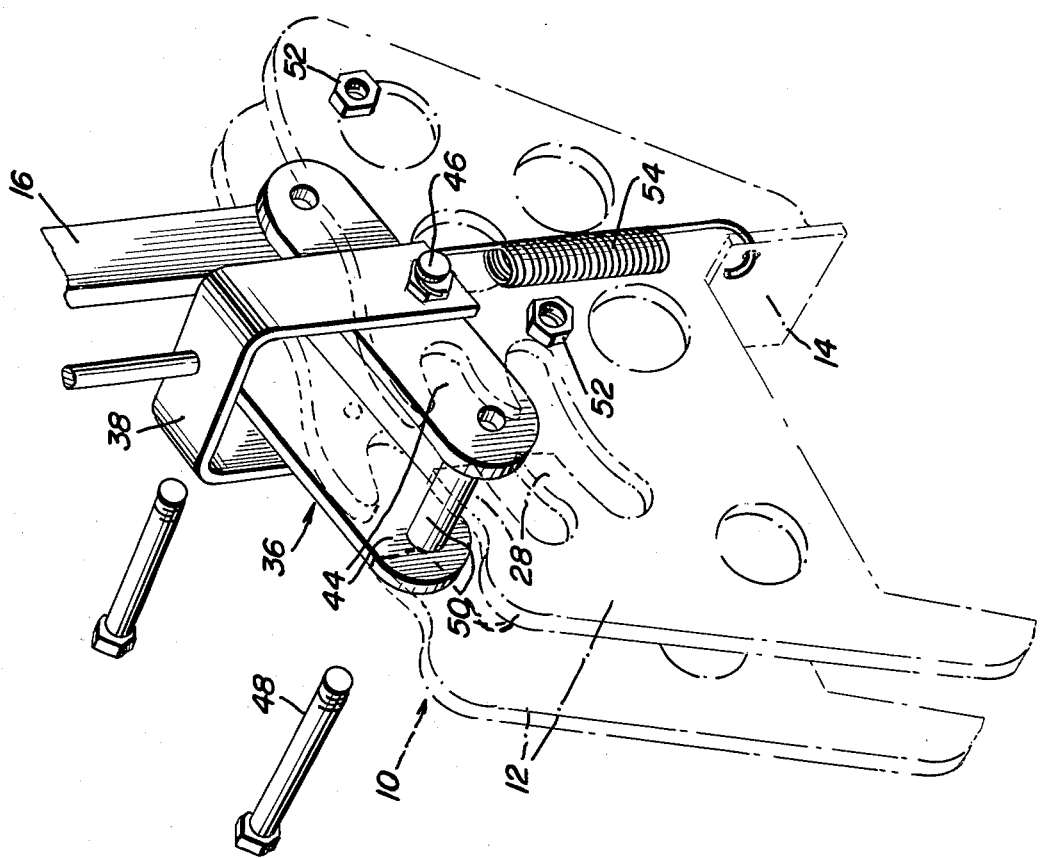

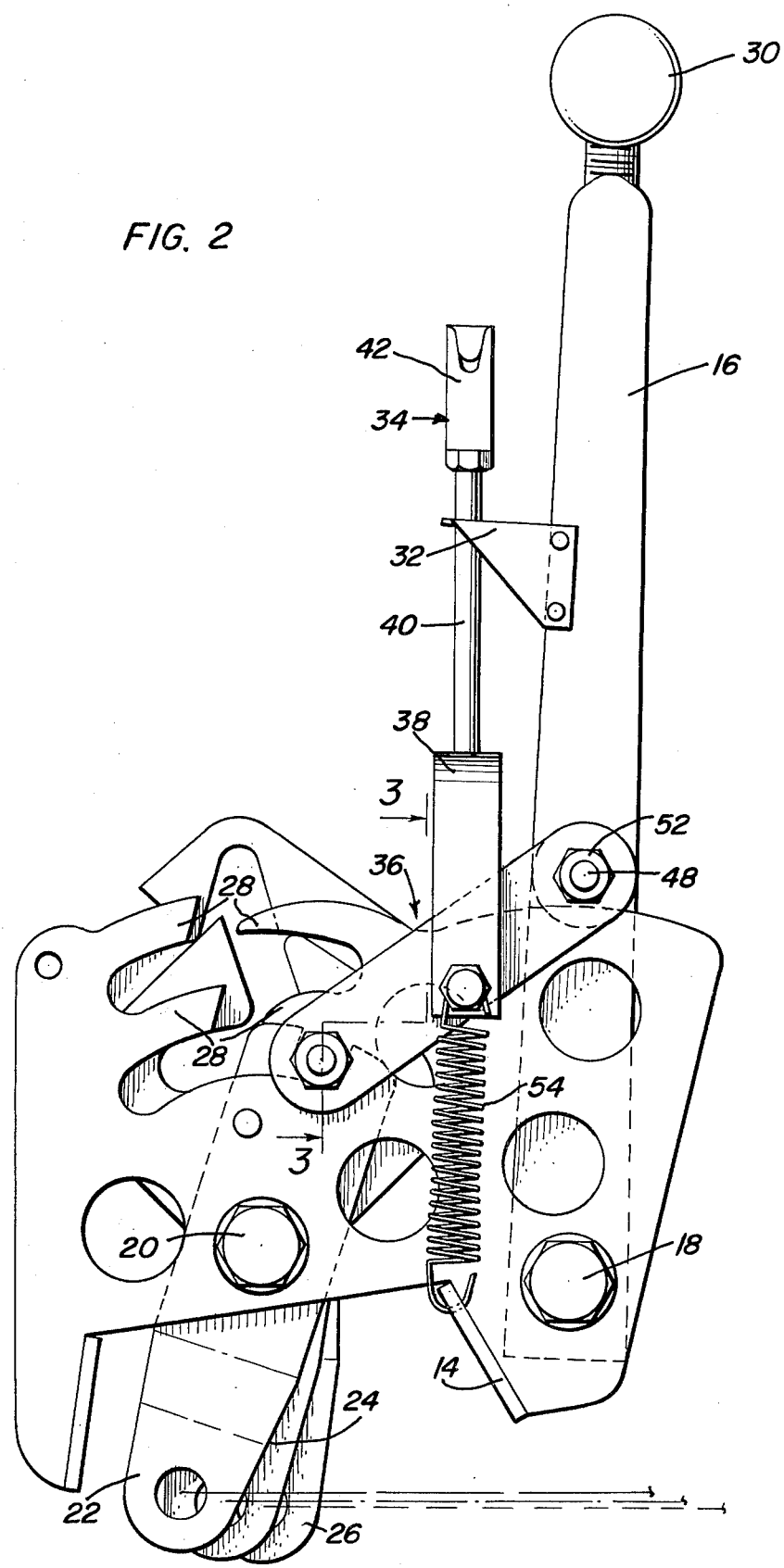

SELECTOR PIN ASSEMBLY FOR MANUAL TRANSMISSION SHIFTER

This invention pertains to improvements for certain types of manual shifters for automotive transmissions, especially for racing. Reference should be had to Bieber U.S. Pat. No. 3,636,793 for a detailed explanation of a particular shifter which the present invention improves and from which it developed.

The Bieber shifter, in common with many other shifters of its generic type, utilizes a plurality of movable plates which have slots which register with each other and with guide slots in the main plates in different combinations. A pin, called the "firing pin", fits through all of these slots. Depending upon the position of the pin with respect to the various levers it will move only one of these levers to effect changes in the gearing through the transmission.

The invention pertains in particular to this firing pin or selector pin assembly.

Heretofore, a solid rod was installed through the selector plates or equivalent structure, with the rod serving as the firing pin. Alternatively, this firing pin was sometimes a member swagged or clipped in place.

All of these prior art firing pins suffer from the disadvantages of difficulty of replacing the pin as well as loosening of the entire selector assembly including the pin. Such looseness is not acceptable in that it provides for sloppy motion of the shifter which in turn could cause missing of a shift or other undesirable effects in the highly competitive atmosphere in which such devices are used.

To solve all of these problems the invention provides an improved selector assembly including a pair of sleeves fitted between the selector plates, with bolts passing through suitable openings in the plate and through the centers of the sleeves. The bolts are tightened to grasp the main plates between themselves, the surfaces being well lubricated in use, whereby a rigid firing pin and selector assembly is provided.

The invention also provides an improved yoke for operating the selector assembly, with improved means for spring biasing the yoke and the selector assembly into its normal position. A dual purpose member which joins the yoke to the selector plates and serves as a spring anchor is provided.

The above and other advantages of the invention will be pointed out or will become evident in the following detailed description and claims, and in the accompanying drawing also forming a part of the disclosure, in which:

FIG. 1 is a perspective view of a shifter showing the improved selector assembly, with many parts not shown or shown in phantom only for the sake of clarity;

FIG. 2 is a side elevational view of a shifter embodying the invention; and

FIG. 3 is a cross-sectional view taken on line 3—3 of FIG. 2.

Shifter 10 embodying the invention comprises a pair of main plates 12 on which the other parts are mounted. A plate 14 is welded to one of the main plates 12. Plate 14 has two functions; it serves as the anchor means for springs 54, and it acts as stop means for one direction of travel of the shift plates 22, 24 and 26. The plate 14 can carry bolt means, not shown, whereby the stop for the plates can be made adjustable.

The main shift lever 16 is pivoted to the plates 12 on a bolt or other suitable pivot means 18, see FIG. 2. A similar pivot 20 mounts a plurality of shift plates or levers 22, 24 and 26 between the main plates 12. Plates 22, 24 and 26 correspond to the members 16 and 17 of the aforementioned Bieber patent. Three are shown in the present embodiment because this shifter 10 is designed for a five speed transmission whereas the earlier Bieber shifter was for a four speed transmission. One of the three levers, 22, 24 or 26, is utilized for reverse gear as well as for one of the five forward speeds; a separate apparatus was provided in the earlier device for the reverse gear, whereby only two such shift levers were required. Of course, it will be understood by those skilled in these arts that the present invention can be used with four or five speed transmissions, the improvements residing primarily in the selector assembly described below.

Means are provided to permit the main shift lever 16 to operate a selected one only of the three levers 22, 24 and 26 and further to permit the successive operation of these levers in a predetermined order, all as is set forth in greater detail in the aforementioned Bieber patent. Basically, it is desired that the transmission go through the gears one, two, three, four and five rapidly and without slipping or skipping and without going backwards. The main plates 12 and the shift levers 22, 24 and 26 are provided with a plurality of teeth, slots and the like all generally indicated by the reference numeral 28, which in cooperation with the firing pin or selector pin of the invention selector assembly, assures these desiderata. The operation of the shifting mechanism per se is set forth in full and complete detail in the Bieber patent, and to the extent the teachings thereof are required to complete this disclosure, said teachings are hereby incorporated by reference.

The main lever 16 comprises a handle 30, and a bracket 32 which carries a trigger-like assembly 34. This trigger 34 operates the invention selector mechanism 36. The improved mechanism 36 comprises a generally U-shaped yoke 38, the top or cross part of which is connected to the rod 40 of the trigger mechanism 34. Operation of the trigger proper 42 moves the rod to raise or lower the yoke 38 to in turn move the remaining portion of the mechanism, in a manner analogous to the parts 31, 32 and 33 of the aforementioned Bieber patent. Such trigger assemblies are well known in these arts.

The lower or free ends of the yoke 38 are positioned outboard of a pair of selector plates 44, and are secured thereto, respectively, by a pair of specially formed screw members 46.

The rear ends of the plates 44 are pivoted to the main shift lever 16, and the front ends are joined together in a rigid manner by a similar joining mechanism. The front end connection is the "firing pin" of the invention, that is, the part that cooperates with the slots and fingers 28 to permit selection of various different gears by manipulation of selective ones of the shift levers 22, 24 and 26.

The connections front and rear between the plates 44 are identical. Each comprises a bolt 48 which fits in a sleeve 50, the outer end of which carries a nut 52. In this manner the sleeve 50 is held rigidly between the two plates 44, the rigid connection being provided forward and aft, thereby rendering the entire assembly of the parts 38 through 52 one rigid assembly which is simple to manufacture and reliable in use.

This combination of the parts 48, 50 and 52 holds the entire structure and especially the front sleeve which serves as the "firing pin" more rigidly. This rigidity permits smoother operation of the shifter. The various surfaces of the parts 12, 44 and the levers 22, 24 and 26 slide on each other but these surfaces are very well lubricated, and the friction is negligible as compared to the strength used by a racer in the heat of competition. Racers literally slam the shifter and the transmission from gear to gear in order to accomplish the quickest possible shifts to gain the maximum possible speed.

The bolt and nut arrangement permits replacement of a sleeve 50, as is periodically required in the use of the shifter, very simply. The prior structure was a special pin or the like to hold these parts together. Of course, where the firing pin was clipped or swagged in place, the invention provides important advantages over such permanent or semi-permanent assemblages.

A pair of tension springs 54 are provided, one on each side of the yoke 38, with one end of each spring attached to a ridge 56 formed in member 46, the other end of the spring attaching to suitably formed openings in plate 14. Heretofore, in commercial embodiments, a compression spring was provided between the bracket 32 and the yoke 38. The provision of the springs closer to the selector assembly 36, equally pulling on both sides is an advantage for the invention over the prior commercial form, and cooperates with the more or less integral or modular firing pin or selector assembly 36.

While the invention has been described in detail above, it is to be understood that this detailed description is by way of example only, and the protection granted is to be limited only within the spirit of the invention and the scope of the following claims.

What is claimed is:

1. In a shifter of the type comprising a pair of main plates, a main lever pivotally mounted between said main plates, a plurality of shift levers pivotally mounted between said main plates, and an improved selector assembly pivotally mounted on said main lever and guided in slots formed in said main plates and in said shift levers for operative engagement with a selected one only of said shift levers, the improvement of said selector assembly comprising a pair of selector plates positioned outwardly of said main plates, a pair of sleeve members positioned between said selector plates one each at the respective ends thereof, a bolt passing through suitable openings in said selector plates and through each said sleeve member, each said bolt being snugly received in each sleeve, and a nut cooperable with each said bolt for securing said selector plates and said sleeve members rigidly together to thereby form said selector assembly, one of said sleeve members comprising the pivotal connection between said selector assembly and said main lever, and the other of said sleeve members comprising the portion of said selector assembly guided in said main plate and shift lever slots to operate said shift levers.

2. The combination of claim 1, manually operable means for moving said selector assembly on its pivotal connection to said main lever to control the engagement of said slot engaging sleeve with a particular shift lever, said moving means comprising a yoke of generally "U" shape, means to pivotally connect the free ends of said yoke to said selector plates, and spring means biasing said yoke and said selector assembly in a predetermined direction about its pivot on said main lever.

3. The combination of claim 2, said free ends of said yoke being positioned outwardly of said selector plates and said main plates, and said means connecting said yoke to said selector plates comprising a pair of screw members each connecting one free end of said yoke to one of said selector plates.

4. The combination of claim 3, each of said screw members comprising a groove formed in its head portion, and said spring means comprising a pair of tension springs each having one end anchored in said screw member groove and its other end secured to anchor means on said main plates.

5. The combination of claim 2, said moving means comprising trigger means mounted on said main lever, and said trigger means comprising a trigger rod connected to the cross piece portion of said yoke.

* * * * *